(No Model.)
H. BALBIAN.
PIPE COUPLING.
No. 436,115.  Patented Sept. 9, 1890.
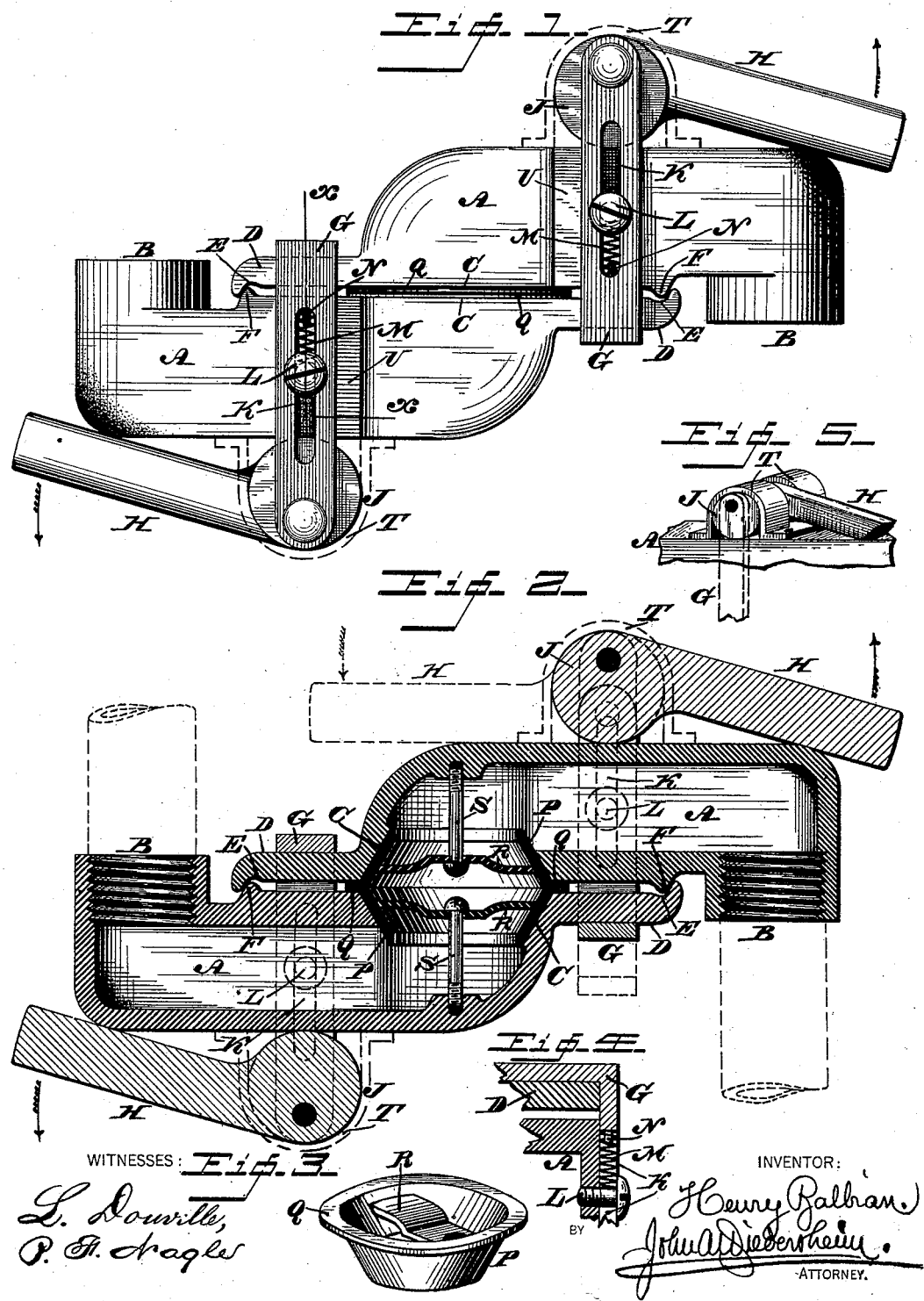

UNITED STATES PATENT OFFICE.

HENRY BALBIAN, OF PHILADELPHIA, PENNSYLVANIA.

PIPE-COUPLING.

SPECIFICATION forming part of Letters Patent No. 436,115, dated September 9, 1890.

Application filed July 3, 1889. Serial No. 316,382. (No model.)

*To all whom it may concern:*

Be it known that I, HENRY BALBIAN, a citizen of the United States, residing in the city and county of Philadelphia, State of Pennsylvania, have invented a new and useful Improvement in Pipe-Couplings, which improvement is fully set forth in the following specification and accompanying drawings.

My invention consists of a coupling for pipe or hose employed for conveying steam, air, water, or other fluid, the same being formed of shells or bodies provided with clamping devices and separating-springs.

It also consists of novel means for securing the packing of the coupling in position.

Figure 1 represents a side elevation of a pipe-coupling embodying my invention. Fig. 2 represents a central longitudinal section thereof. Fig. 3 represents a perspective view of the packing employed. Fig. 4 represents a vertical section of a portion on line $x$ $x$, Fig. 1. Fig. 5 represents a perspective view of a modification of the coupling-lever.

Similar letters of reference indicate corresponding parts in the several figures.

Referring to the drawings, A designates two shells or hollow bodies, each having an open end B and an open end C as inlets or outlets, the ends C being in communication, whereby fluid may pass through the bodies. The bodies adjacent to the ends C are formed with arms D, the inner faces of which have depressions or grooves E to receive tongues F on the bodies, whereby the bodies may be properly seated on each other and longitudinal displacement of the same prevented.

G designates yokes which embrace the bodies A and arms D, and have pivoted to them cam or eccentric levers H, the heads J whereof bear against the bodies A, so as to be tightened thereon. In the sides of the yokes are slots K, which receive screws L, the latter being connected with the bodies A, thus securing the yokes in position and guiding the same in their motions during the clamping and releasing operations of the coupling. Within the slots K are coiled springs M, which bear against the end walls of said slots and the screws L, said walls having pins or studs N which enter the springs and prevent displacement of the same. Within the bodies, at the ends C thereof, are packings P, which are tubular or of the form of frustums of hollow cones, the bases of which have flanges Q, which are in contact and project outside of the bodies, so as to occupy a position between the same, as clearly shown in Figs. 1 and 2.

In order to retain the packings in position when the coupling is separated, I employ cross-heads R, which bear against the inner faces of the packings, and are held thereagainst by screws S, the latter being secured to the walls of the bodies A.

It will be seen that the packings may be firmly compressed against the contiguous walls of the ends C of the bodies A by properly rotating the screws S, thus tightening the cross-heads against the inner faces of the packings, it being noticed that the seats of the packings are conical, so as to conform to the exterior contour of the packings. When the screws are removed, the packings may be displaced, when so desired.

It will be seen that when the bodies are in coupling positions the levers H are properly rotated, whereby the yokes G draw the bodies together, thus firmly connecting or coupling the same and compressing the flanges of the packings, producing tight joints at the coupled ends C of the bodies.

When the levers are rotated in opposite directions, the power of the same is removed from the bodies A and yokes G, thus permitting the bodies to separate. The springs M now exert their pressure so as to force the yokes in the direction from the heads of the lever, thus overcoming any sticking of the yokes and removing the cross-bars of the latter from contact with the arms E, so that the bodies may be readily disconnected and the coupling thereby separated.

In Fig. 5 the head of the lever is guided in ears T, secured to the body A. The sides of the bodies are formed with shoulders U for guiding and steadying the yokes G, which abut against the same. The ears T are also shown in dotted lines, Fig. 1.

Having thus described my invention, what I claim as new, and desire to secure by Letters Patent, is—

1. A pipe-coupling consisting of two shells having open ends, conical packings inserted in the openings in the connected ends and provided with flanged rims, cross-heads with securing-screws for said packing, and yokes with clamping devices for said shells, said parts being combined substantially as described.

2. A pipe-coupling consisting of two shells, each having open ends, and a projecting arm with a groove thereon, and a tongue adapted to engage in the groove of the other shell, yokes embracing said shells and provided with clamping devices, a hollow conical packing with flanged rim, the latter between said shells, and a cross-head with adjusting-screw for clamping said conical packing in place, said parts being combined substantially as described.

3. A pipe-coupling having two shells with openings therein, a packing of conical form and having a flanged base, the latter inserted between the shells, the body of the packing being within one of the shells, a cross-head with ends bearing against the inner wall of the packing, and a screw passing through the cross-head and clamping the packing in place, said parts being combined substantially as described.

HENRY BALBIAN.

Witnesses:
JOHN A. WIEDERSHEIM,
WM. C. WIEDERSHEIM.